United States Patent [19]

Goutte et al.

[11] Patent Number: 5,023,921
[45] Date of Patent: Jun. 11, 1991

[54] METHOD AND A DEVICE FOR PROCESSING ELECTRIC SIGNALS COMING FROM THE ANALYSIS OF THE LINE OF AN IMAGE

[75] Inventors: Robert Goutte, Caluire; Gilles Jacquemod, Villeurbanne; Christophe Odet, Vienne, all of France

[73] Assignee: European Coal and Steel Community, Luxembourg

[21] Appl. No.: 353,435

[22] Filed: May 18, 1989

[30] Foreign Application Priority Data

Jun. 27, 1988 [LU] Luxembourg .......................... 87259

[51] Int. Cl.$^5$ .......................... G06K 7/00; G06K 9/20; H04N 3/14; H04N 5/355
[52] U.S. Cl. ........................................ 382/58; 382/67; 382/68; 358/213; 358/213.28
[58] Field of Search ............... 382/67, 68; 358/213.27, 358/213.28, 213

[56] References Cited

U.S. PATENT DOCUMENTS

| | | |
|---|---|---|
| 3,697,760 | 10/1972 | Biet et al. |
| 4,092,632 | 5/1978 | Aqulnek .......................... 382/67 |
| 4,147,928 | 4/1979 | Crean et al. .......................... 382/67 |
| 4,465,939 | 8/1984 | Tamura .......................... 382/67 |
| 4,467,365 | 8/1984 | Murayama et al. ............ 358/213.28 |
| 4,712,134 | 12/1987 | Murakami ...................... 358/213.28 |
| 4,765,564 | 8/1988 | Colvocoresses ............... 358/213.28 |
| 4,910,401 | 3/1990 | Woods .......................... 358/213.28 |
| 4,913,539 | 4/1990 | Lewis .......................... 352/5 |

FOREIGN PATENT DOCUMENTS

070620 1/1983 European Pat. Off. .
213539 8/1986 European Pat. Off. .
2385274 3/1977 France .

OTHER PUBLICATIONS

Patent Abstracts of Japan, vol. 6, No. 77 (E-106) [455], May 14, 1982, JP-A-57-14-250 (Canon K. K.), 25-0-1-1982.

Primary Examiner—Michael Razavi
Assistant Examiner—Steven P. Fallon
Attorney, Agent, or Firm—Sughrue, Mion, Zinn, Macpeak & Seas

[57] ABSTRACT

The invention relates to a method and a device for processing an electric signal constituting the analysis of a line of an image and issued by linear detectors such as a strip (20) of adjacent photodetectors (such as 7, 8) which realize a sampling at a constant pitch. According to the invention, k analyses of the same line are carried out with respective lateral shifts of 1/k of the pitch of the photodetectors, an oversampled signal is generated by multiplexing the k samples, and the oversampled signal is submitted to a filtering inverse to the filtering inherent to the spatial smoothing. Thus, the degradation of the signal due to the folding of the spectrum and to the filtering inherent to the integration of the "light" on the photosensible surface of the photodetectors is reduced.

8 Claims, 2 Drawing Sheets

METHOD AND A DEVICE FOR PROCESSING ELECTRIC SIGNALS COMING FROM THE ANALYSIS OF THE LINE OF AN IMAGE

FIELD OF THE INVENTION

The invention is related to a method for processing electric signals coming from the analysis of a line of an image issued by linear detectors such as a strip of adjacent photodetectors which carry out a sampling of the signal at constant pitch. The invention also relates to devices for the implementation of the method.

BACKGROUND OF THE INVENTION

Photodetector strips, for example photodiodes or CCD cells (charge couple device) are used for analysing an image line after line, the image passing in front of the strip. Such an image can for example come from an X-ray non destructive test apparatus for the control of luggage in airport terminals.

The detectors integrate at each moment the light energy projected onto the photosensisitive surface of the detector. The electric output signal of the detector is sampled once per line and is multiplexed with the output signals of the other detectors in order to constitute the signal of one line of the image. In general, the signal output from the detectors is converted into a digital signal in view of a further digital processing.

Because of the integration of the light signal on the photosensisitive surface of the detector, the electric signal is smoothed with respect to the corresponding light signal. The sampling further creates problems of spectral folding when the input light signal has a large bandwidth. The smoothing corresponds to the convolution of the signal by a gate centered on the frequency axis origin; the spectrum of the signal is multiplied by the transfer function of this filter, which is a sinus cardinal.

If the light has a large bandwidth, the transfer function of the filter restricts the bandwidth of the smoothed signal. The effect of the smoothing filter is to enhance the low frequencies. There are thus two phenomena which degrade the information in the useful band of the signal: on the one hand, the signal has been submitted to a low frequency filtering and on the other hand, the folded parts of the spectrum disturb the low frequencies.

A reduction of the size of the photosensible surface of the photodetectors could surely increase the resolution, but would change nothing as to the problem of folding of the spectrum. One could think of making the multiplexed electric signal pass through a filter the transfer function of which is the inversion of that corresponding to the integration of the information on the photosensisitive surface of the detector. But this correction of the spectrum would not eliminate the contributions of the signals due to the folding of the high frequencies.

SUMMARY OF THE INVENTION

The invention thus aims at conceiving an improved method for processing electric signals coming from the analysis of a line of an image scanned by at least one strip of adjacent photodetectors which realize a sampling of the signal at a constant pitch. As for the method, this object is attained in that k analyses of the same line are carried out with respective lateral shifts of 1/k of the pitch of the photodetectors, that an oversampled signal is generated by multiplexing the k samples and that the oversampled signal is submitted to a time filtering which is inverse to the filtering inherent to the spatial smoothing of the photodetectors.

As to devices for the application of this method, reference is made to the corresponding claims.

DETAILED DESCRIPTION OF THE INVENTION

The invention will now be described in more detail by means of several examples and the annexed drawings.

Figure 1:
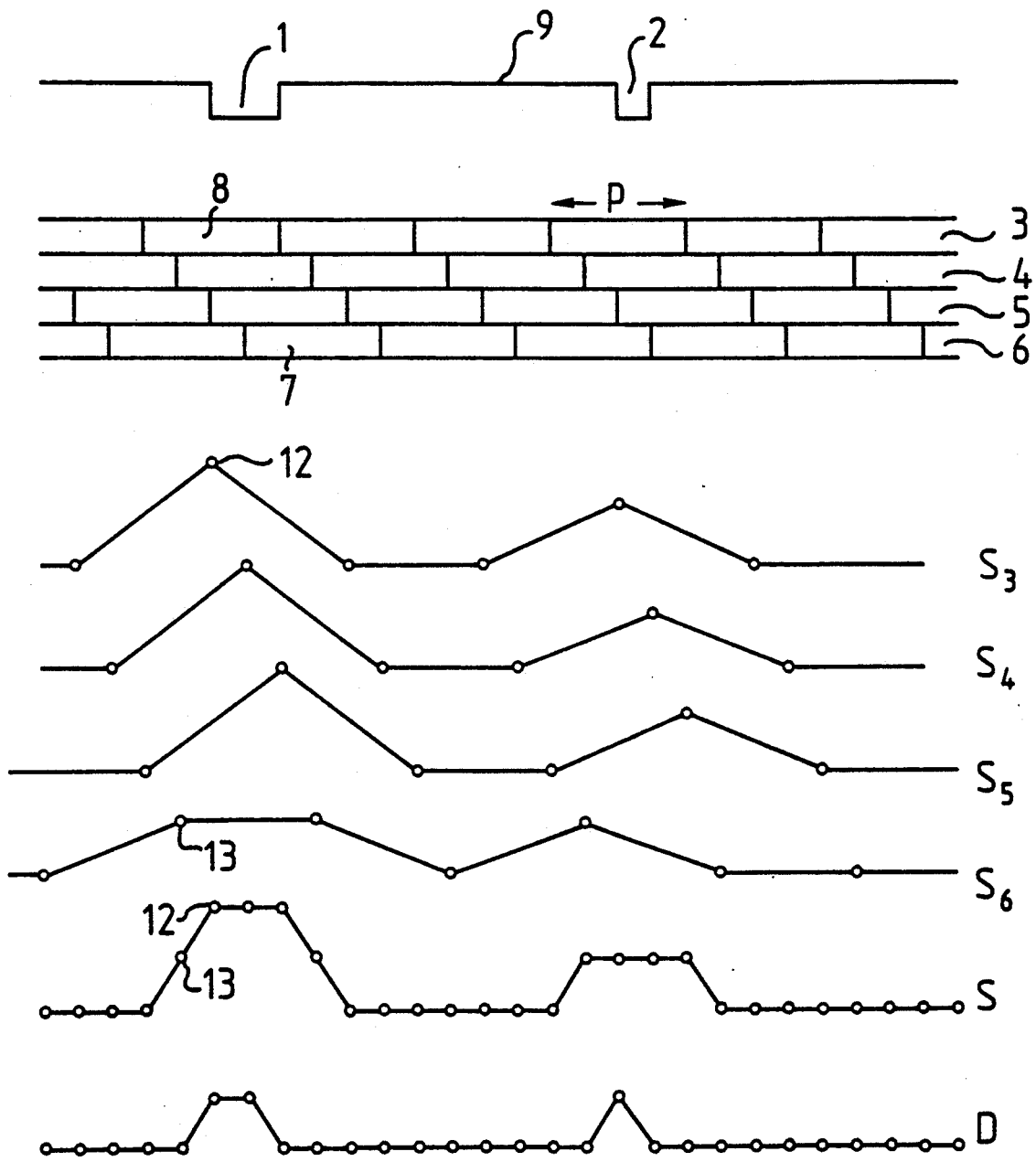
FIG. 1 shows in a very schematical way the principle of the method according to the invention.

FIG. 1 refers to a sample of a sheet of steel which comprises two artificial faults in the form of grooves of different widths. When this sheet is scanned perpendicularly to the grooves with an ideal measurement head, a signal 9 is obtained such as shown at the top of FIG. 1, the two grooves corresponding to the rectangular pulses 1 and 2. If there are fissures due for example to an incorrect welding of a sheet of steel, the width of the pulses is always small with respect to the dimensions of a photodetector. It is thus impossible to establish with such a photodetector a measurement signal which is a true image of the fissures.

Below this ideal signal, FIG. 1 shows 3, 4, 5 and 6 of photodetectors such as 7 or 8. It is supposed that the photodetectors are adjacent and that they are disposed at the constant pitch p in each strip. The four strips are mutually shifted by a distance p/4 and they are supposed to read simultaneously the same line of the image.

FIG. 1 further shows four signals registered by the unit of photodetectors of a strip, i.e. a signal $S_3$ concerning the strip 3, a signal $S_4$ concerning the strip 4, and so on for the strips 5 and 6.

The photosensisitive strips such as those of the CCD type (charge coupled device) are supplied with a preprocessing and an analog-to-digital converting device, so that the signals $S_3$ to $S_6$ symbolize the succession of digital values supplied by the strips 3 to 6 respectively. By comparing the signal 9 at the top of FIG. 1 with the position of the different photodetectors of the strips 3 to 6, the signals $S_3$ to $S_6$ can easily be reconstituted. Thus, the signal $S_3$ starts with two levels "zero" corresponding to the first two photodetectors of this strip, which are not affected by one of the grooves 1 and 2. Then, a value 12 non nul is observed in the photodetector 8, which covers totally the pulse 1. The two following detectors again show the value zero, and so on.

The amplitude 12 of a value non nul is proportional to the integration of the part of the pulse such as 1 affected by the detector. Thus, the detector 8 of the strip 3 covering the entirety of the pulse 1 leads to an amplitude 12 higher than that created by the photodetector which totally covers the pulse 2 of smaller width. In the same way, a detector 7 of the strip 6, which covers the pulse 1 only partially, leads to an amplitude 13 which is smaller than the amplitude 12.

The analysis of the optical signal by a single photodetector strip would thus produce the signals $S_3$ and $S_6$, which are not significant at all for the signal 9 at the top of the figure. This has two principal causes:

(a) a photodetector integrates the signal on its elementary surface, which causes a loss of the high frequency parts of the optical signal, this effect being called "spatial smoothing".

(b) The ideal signal is sampled at the pitch p. As there is no access to the signal until after it has been sampled, a spectral folding is observed when the ideal signal has a large bandwidth. A diminution of the size of the photodetectors would surely increase the resolution, but would not change anything as to the problem of spectral folding. On the other hand, an inverted filtering with spatial smoothing effect does not permit to eliminate the perturbation of the low frequencies by the high frequencies after spectral folding.

According to the invention, the four signals $S_3$ to $S_6$ are interlaced or multiplexed in order to produce the oversampled signal S, which comprises a succession of the four amplitudes of the photodetectors of identical range in the four strips. Thus, the amplitude 12 of signals $S_3$ and the amplitude 13 of the signals $S_6$ are marked on the oversampled signal S at the spots which belong to them.

The signal S is then submitted to a deconvolution in an autoregressive filter, which realizes the inverse filtering to that corresponding to the integration of the signal on the surface of the photodetectors. This deconvoluted signal D constitutes an almost true image of the signal showing at the top of this drawing, because this filter is adapted to the particular shape of the filtering function during the integration of the signal by the photodetectors (gate function).

Figure 2:
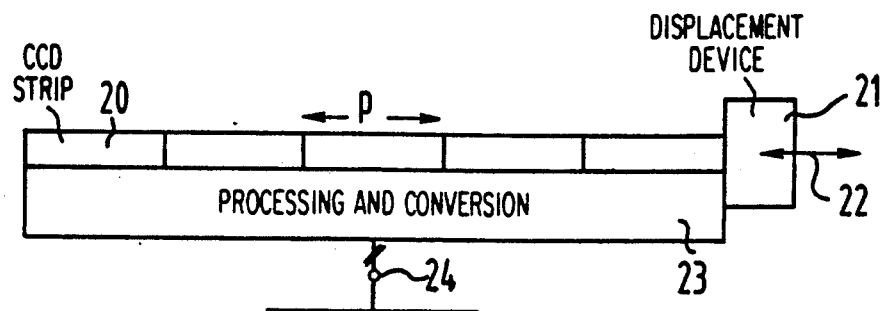
FIG. 2 is a block diagram of a first embodiment of this method implying a unique strip.

The method such as explained above by means of FIG. 1 can be applied in several ways. A first embodiment, which is shown in FIG. 2, uses a single CCD strip 20, which is mechanically coupled to a displacement device 21. This device comprises a step-by-step motor, which, after each sampling, shifts the strip 20 in the direction of the line (symbolized by an arrow 22) at a distance p/4. Thus, the strip takes successively the positions which correspond to the strips 3, 4, 5, 6 in FIG. 1. Then, the strip comes back into the original position and a new cycle of four samplings starts after the advance of the sheet by one pitch perpendicularly to the arrow 22.

A strip of photodetectors of the commercial CCD type is normally supplied together with an electronic device 23 of preprocessing and conversion into a digital signal, and supplying at an output 24 in succession the values corresponding to the different detectors of the strip. Each value is for example encoded by eight bits, which are available in parallel. These values are applied to a memory called oversampling memory 25, the capacity of which corresponds to the number of values coming from four sampling cycles of the strip. At the output 26 of this memory, these values are interlaced so that there is a succession of four samples coming from the same detector followed by the values corresponding to the following detector and so on. At the output 26 there is thus the equivalent of the signal S of FIG. 1. This succession of values is finally applied to an autoregressive filter 27, the transfer function of which is inverse to that inherent to the spatial smoothing of the photodetectors of the strip. The filter is for example of the looped shift register type. The spectral folding practically no more falsifies the signal S, because the folding axis is four times farther away in frequency than in the case of a not oversampled signal D (see FIG. 1), which represents rather precisely the form of the physical signal 9 at the top of FIG. 1.

Figure 3:
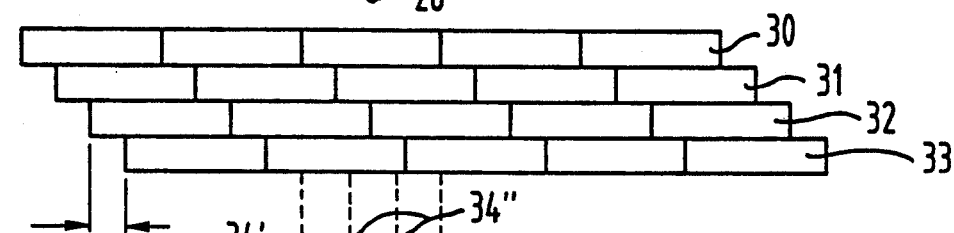
FIG. 3 is a variant of FIG. 2 implying four adjacent strips.

If, for reasons of speed and mechanical stability of the device, a step-by-step shifting of a strip such as 20 is impossible, four strips 30, 31, 32, 33 are used. As shown in FIG. 3, strips 30–33 are mounted in such a way that these photodetectors receive simultaneously the light coming from the same line to be analyzed. Each strip is supplied with its own pretreatment electronic device such as 23 (FIG. 2), and supplies at an output 34' (for the strip 30) or 34" (for the strip 31 and so on) the succession of digital values corresponding to the different detectors to a multiplexer 35, which has the same function as the oversampling memory 25 of FIG. 2, except for the memorisation, and it supplies by its output the oversampled succession according to the signal S of FIG. 1. The autoregressive filter 27 is the same as in FIG. 2.

Figure 4:
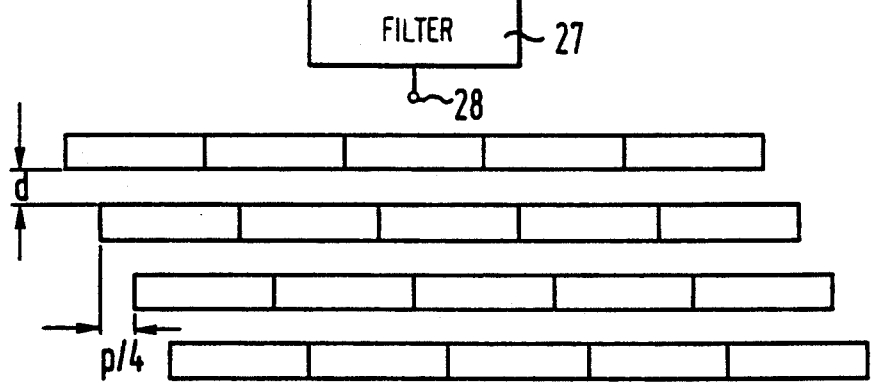
FIG. 4 is another variant implying four not adjacent strips.
Figure 4:
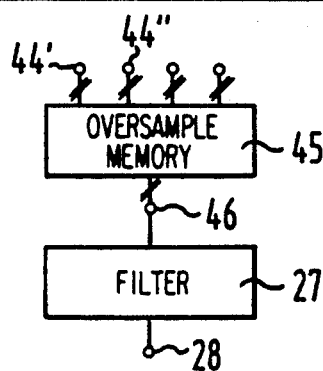

Finally, FIG. 4 shows another variant, which differs from that of FIG. 3 by a certain interspace d between the four strips 40, 41, 42 and 43 perpendicularly to the shift direction. At a given moment, the four strips thus "read" different lines of the image to be analyzed. The oversampling must take into account the passing of the image perpendicularly to the line direction. As before, each strip is associated to its own pre-processing electronic device and supplies on a unique outlet such as 44' for the strip 40 and 44" for the strip 41 the succession of the values of the line analyzed by the respective strip at a given moment. A synchronization and oversampling memory 45 rearranges the values coming from the different strips and belonging to the same line, as a function of the advance speed perpendicularly to the direction of this line. This memory must thus have a greater capacity than the memory 25 of FIG. 2, because it must be able to store part of the image corresponding to the surface covered by the four strips and its interspaces d. At the outlet 46 of this memory, there are thus to be found the same values as at the outlet 36 and 26 of the FIGS. 3 and 2, respectively, which are then submitted to a filtering in a filter 27 as before.

Of course, the invention is not limited to the embodiments described above. In particulier, an oversampling rate k different from four can be chosen. Moreover, one can, besides the analysis of fissures in a sheet of steel by means of X-rays, proceed to the analysis of a photographic negative or to the non-destructive control of materials is radiated by an appropriate radiation such as visible, infrared or ultraviolet. The method according to the invention is able to improve the two limiting factors related to the nature of the strips of photodetectors: namely the smoothing and the spectral folding. Due to the oversampling, the folding effect of the spectrum is reduced. The signal can then be decorrelated over a larger spectral width. Surely, a low-pass filtered version of the ideal signal may always be obtained, but one disposes of correct informations over a larger frequential range and the smoothing effect of the photodetectors has been reduced.

We claim:

1. A method for analyzing a line of an image by processing an electrical signal comprising analysing a line of an image, issued by linear detectors such as a strip of adjacent photodetectors carrying out a sampling of said signal at a constant pitch, wherein K analyses of the same line with lateral shifts respectively 1/k steps of the photodetectors are effected, and generating an oversampled signal by multiplexing the k samples, and time filtering the oversampled signal, the time filtering being accomplished by a filter with a transfer function which is inverse to the filtering inherent to the spatial smoothing of the photodetectors.

2. A device for analyzing a line of an image by processing an electrical signal issued by linear detectors carrying out a sampling of the signal at a constant pitch by carrying out k analyses of the same line with lateral shifts respectively 1/k steps of the linear detector, and generating an oversampled signal by multiplexing the k samples and time filtering the oversampled signal, said device comprising a strip of photodetectors constituting said linear detectors disposed movably in the direction of the line to be analyzed in order to permit the successive reading of k samples of each detector, means for applying to an oversampling memory the succession of signals corresponding to the sampling of the line, and means for supplying said oversampled signal to a filter, the transfer function of which is inverse to that of the filtering inherent to the spatial smoothing due to the size of the photodetectors.

3. A device for analyzing a line of an image by processing an electric signal issued by linear detectors carrying out a sampling of the signal at a constant pitch by carrying out k analyses of the same line with lateral shifts respectively 1/k steps of the linear detectors, and generating a oversampled signal by multiplexing the k samples and time filtering the oversampled signal, said device comprising k successive adjacent strips of photodetectors disposed parallelly in order to analyze simultaneously k times the same line of the image, a means for shifting each strip laterally with respect to the adjacent strip by a distance corresponding to 1/k of the pitch of the linear detectors, said linear detectors comprising said photodetectors, the k strips being connected, by serial outputs thereof supplying successively signals corresponding to the sampling of different spots of said line to a common multiplexer, and said common multiplexer supplying said oversampled signal to a filter, the transfer function of which is inverse to that inherent to the spatial smoothing of the photodetectors.

4. A device for analyzing a line of an image by processing an electric signal issued by linear detectors carrying out the sampling of a signal at a constant pitch by carrying out k analyses of the same line with lateral shifts respectively 1/k steps of the linear detectors, and generating an oversampled signal by multiplexing the case samples and time filtering the oversampled signal, said device comprising k strips of adjacent photodetectors forming said linear detectors and disposed in parallel for analyzing successively k times the same line of the image, a means for shifting each strip laterally with respect to the adjacent strip by a distance corresponding to 1/k of the pitch of the photodetectors, a means connecting the k strips by serial outputs thereof to a common oversampling memory and a means supplying the output of the oversampling memory to a filter having a transfer function of which is inverse to that of the filtering inherent to the spatial smoothing of the photodetectors.

5. A device according to claim 2, wherein the strip of photodetectors is associated with a pre-processing circuit to convert the signals into digital form and said filter is constituted by an autoregressive filter of the looped shift register type.

6. A device according to any one of claims 2 to 5 substantially as hereinbefore described with reference to and as illustrated in the accompanying drawings.

7. A device according to claim 3, wherein said strips of photodetectors are associated with a pre-processing circuit to convert the signals into digital form, and said filter is constituted by an autoregressive filter of the looped shift register type.

8. A device according to claim 4, wherein said strips of photodetectors are associated with a pre-processing circuit to convert the signals into digital form, and said filter is constituted by an autoregressive filter of the looped shift register type.

* * * * *